(12) United States Patent
Zarakowski et al.

(10) Patent No.: US 10,740,185 B2
(45) Date of Patent: Aug. 11, 2020

(54) INPLACE PROCESS RESTART

(71) Applicant: INTERNATIONAL BUSINESS MACHINES CORPORATION, Armonk, NY (US)

(72) Inventors: Michal Zarakowski, Cracow (PL); Maciej Snopczynski, Cracow (PL); Bartlomiej S. Filipek, Filipowice (PL); Przemyslaw Jurczak, Jaroslaw (PL)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 16/142,228

(22) Filed: Sep. 26, 2018

(65) Prior Publication Data
US 2020/0097364 A1 Mar. 26, 2020

(51) Int. Cl.
G06F 11/14 (2006.01)
G06F 9/48 (2006.01)

(52) U.S. Cl.
CPC .......... G06F 11/1438 (2013.01); G06F 9/485 (2013.01); G06F 2201/805 (2013.01)

(58) Field of Classification Search
CPC .............. G06F 11/1438; G06F 11/1479; G06F 11/0793; G06F 11/366; G06F 11/0772
See application file for complete search history.

(56) References Cited

U.S. PATENT DOCUMENTS

| | | | |
|---|---|---|---|
| 5,715,386 A * | 2/1998 | Fulton, III | G06F 11/1438 714/15 |
| 6,453,430 B1 | 9/2002 | Singh et al. | |
| 6,591,379 B1 * | 7/2003 | LeVine | G06F 11/0715 714/15 |
| 6,745,321 B1 * | 6/2004 | Floyd | G06F 9/3836 710/267 |
| 6,883,170 B1 * | 4/2005 | Garcia | G06F 11/1438 707/999.001 |
| 7,185,320 B2 * | 2/2007 | Gouriou | G06F 11/362 714/E11.207 |
| 7,669,182 B2 * | 2/2010 | Garcia | G06F 11/1438 707/609 |

(Continued)

OTHER PUBLICATIONS

Peter Mell et al, The NIST Definition of Cloud Computing, National Institute of Standards and Technology, Publication 800-145, 2011, entire document.

(Continued)

*Primary Examiner* — Nadeem Iqbal
(74) *Attorney, Agent, or Firm* — Patrick J. Daugherty; Daugherty & Del Zoppo Co., LP

(57) ABSTRACT

Aspects utilize computer processors to restart a hung process. The processors are configured to, in response to determining that a child process that is executing within an operating system is in a hung state, pause a parent process that is executing within the operating system, wherein a data operation of the parent process is dependent upon a data output of the child process, determine a cause of the hung state of the child process, ready the parent process to restart as a function of the determined cause of the hung state of the child process, and in response to determining that the parent process is ready for restart, notify the operating system that the child process is ready for restart, restart the paused parent process and restart the child process.

20 Claims, 6 Drawing Sheets

(56) References Cited

U.S. PATENT DOCUMENTS

| | | |
|---|---|---|
| 7,886,196 B2 | 2/2011 | Reichert et al. |
| 9,021,485 B2 * | 4/2015 | Vanderpool ......... G06F 11/1438 718/102 |
| 9,417,918 B2 | 8/2016 | Chin et al. |
| 10,061,631 B2 * | 8/2018 | Zhang ................. G06F 11/0772 |
| 2003/0037290 A1 | 2/2003 | Price et al. |
| 2004/0168157 A1 | 8/2004 | Hundt et al. |
| 2010/0050176 A1 | 2/2010 | Vanderpool |
| 2015/0143381 A1 | 5/2015 | Chin et al. |

OTHER PUBLICATIONS

Oren Laadan et al, Transparent Checkpoint-Restart of Multiple Processes on Commodity Operating Systems, USENIX Annual Technical Conference, 2007, entire document.

* cited by examiner

```
bash,11
  `-scriptA.sh,122 ─── 302
      |-scriptB1.sh,125 ─── 304
      |    |-python,1263 ─── 312
      |    |    |-worker,2266, range=11,20 ─── 310
      |    |    `-worker,2267, range=21,40
      |    |-python,1264
      |    |    |-worker,3211, range=41,50
      |    |    |-worker,3212, range=51,60
      |    |    |-worker,3213, range=61,70
      |    |    `-worker,3214, range=71,80
      |    `-python,1265
      |         `-worker,3311, range=81,90
306 ──|-scriptB1.sh,126
308 ──|    `-subscript.sh,142
      `-scriptB3.sh,229
```

FIG. 6

INPLACE PROCESS RESTART

BACKGROUND

A hanging or frozen process occurs when a computer program ceases to respond to inputs. Examples include when a graphical user interface no longer responds to a keyboard or mouse input or when a client or server does not respond to an input task. A hanging process can have several causes. These include hardware or software defects like an infinite loop, long-running uninterruptable computation, resource exhaustion, underperforming hardware, external events like a slow network environment, misconfiguration, and compatibility issues.

A hang may be temporary. This can occur when the cause of the hang resolves itself. A hang may also be permanent. In this case, manual intervention may be required. Operating systems often include means to forcibly terminate the hung process including a forcible reboot of the machine via power cycling, a kill command line, graphical means like an "End Task" button, and a watchdog time that reboots the computer in the event of a hang.

SUMMARY

In one aspect of the present invention, a computerized method for restarting a hung process includes executing steps on a computer processor. Thus, a computer processor is configured to, in response to determining that a child process that is executing within an operating system is in a hung state, pause a parent process that is executing within the operating system. Wherein a data operation of the parent process is dependent upon a data output of the child process, the computer processor determines a cause of the hung state of the child process and readies the parent process to restart as a function of the determined cause of the hung state of the child process. In response to determining that the parent process is ready for restart, the computer processor notifies the operating system that the child process is ready for restart, notifies the operating system that the child process is ready for restart, restarts the paused parent process and restarts the child process.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to, in response to determining that a child process that is executing within an operating system is in a hung state, pause a parent process that is executing within the operating system, wherein a data operation of the parent process is dependent upon a data output of the child process, determine a cause of the hung state of the child process, ready the parent process to restart as a function of the determined cause of the hung state of the child process, in response to determining that the parent process is ready for restart, notify the operating system that the child process is ready for restart, restart the paused parent process and restart the child process.

In another aspect, a computer program product for restarting a hung process includes executing steps on a computer processor that has a computer-readable storage medium with computer readable program code embodied therewith. The computer readable hardware medium is not a transitory signal per se. The computer readable program code includes instructions for execution which cause the processor to, in response to determining that a child process that is executing within an operating system is in a hung state, pause a parent process that is executing within the operating system, wherein a data operation of the parent process is dependent upon a data output of the child process, determine a cause of the hung state of the child process, ready the parent process to restart as a function of the determined cause of the hung state of the child process, in response to determining that the parent process is ready for restart, notify the operating system that the child process is ready for restart, restart the paused parent process and restart the child process.

BRIEF DESCRIPTION OF THE DRAWINGS

These and other features of embodiments of the present invention will be more readily understood from the following detailed description of the various aspects of the invention taken in conjunction with the accompanying drawings in which:

FIG. 6 depicts an illustration of an embodiment of the present invention.

DETAILED DESCRIPTION

Figure 1:
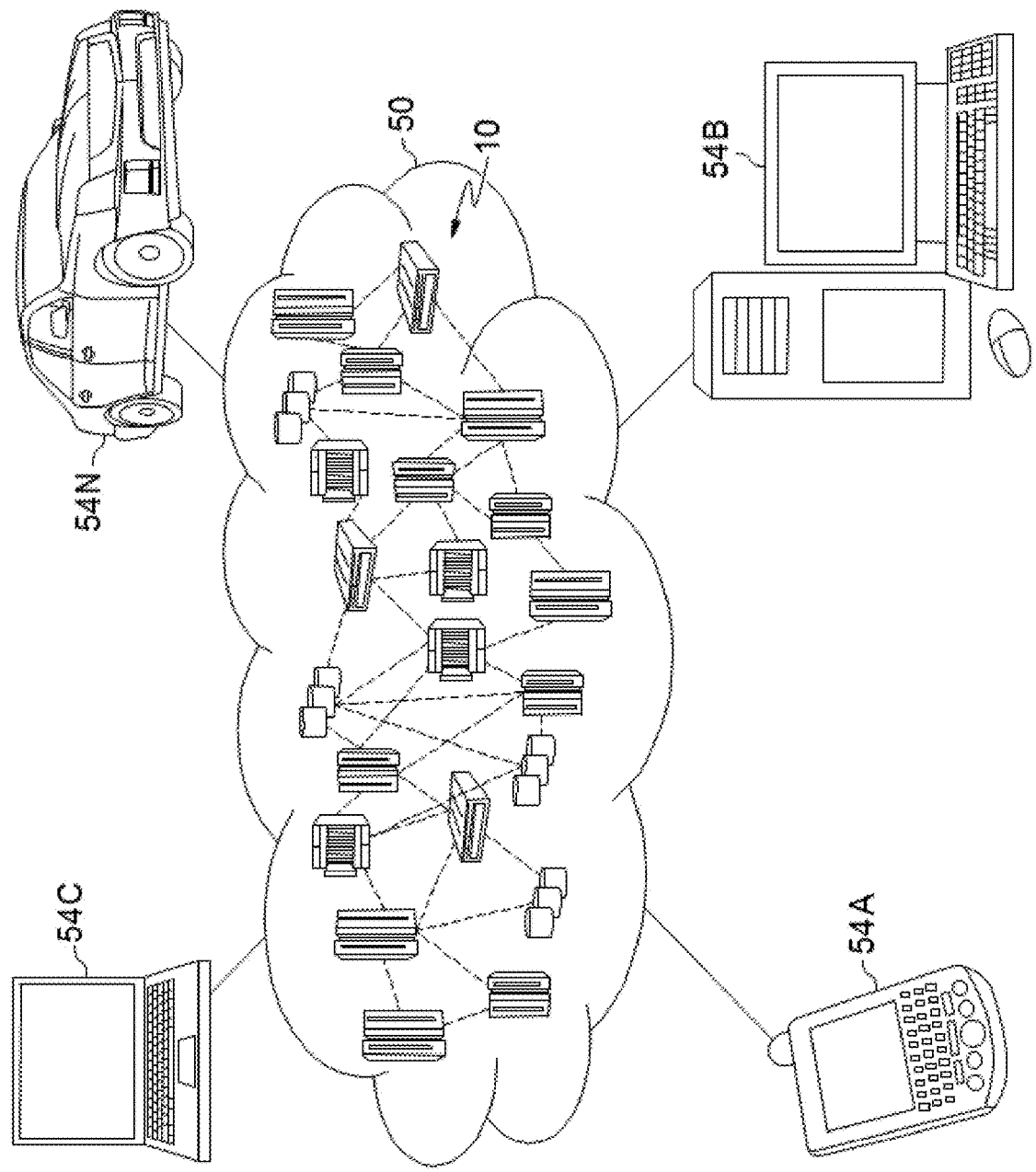
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, mechanically encoded devices such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment f is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
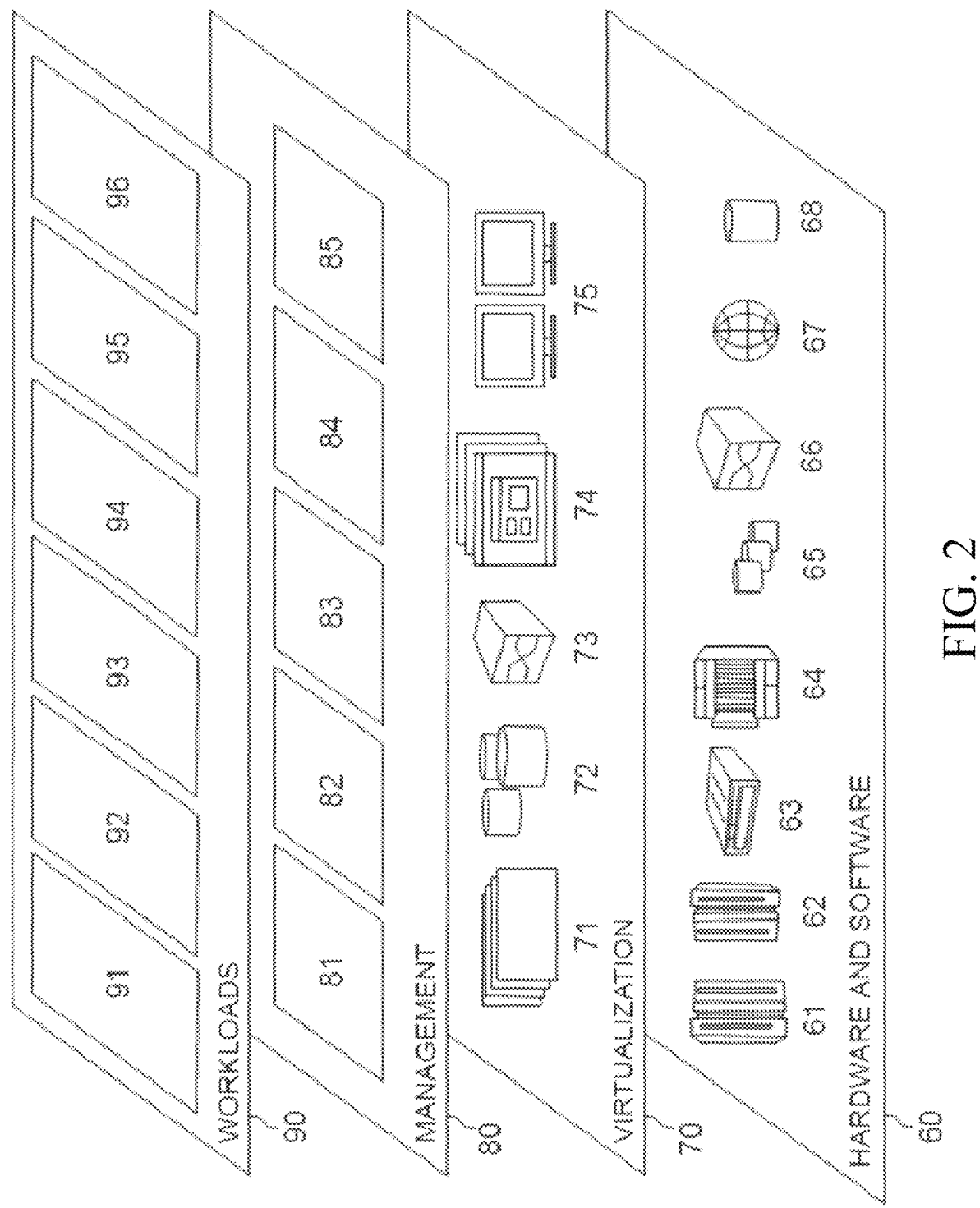
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for restarting a hung process 96.

Figure 3:
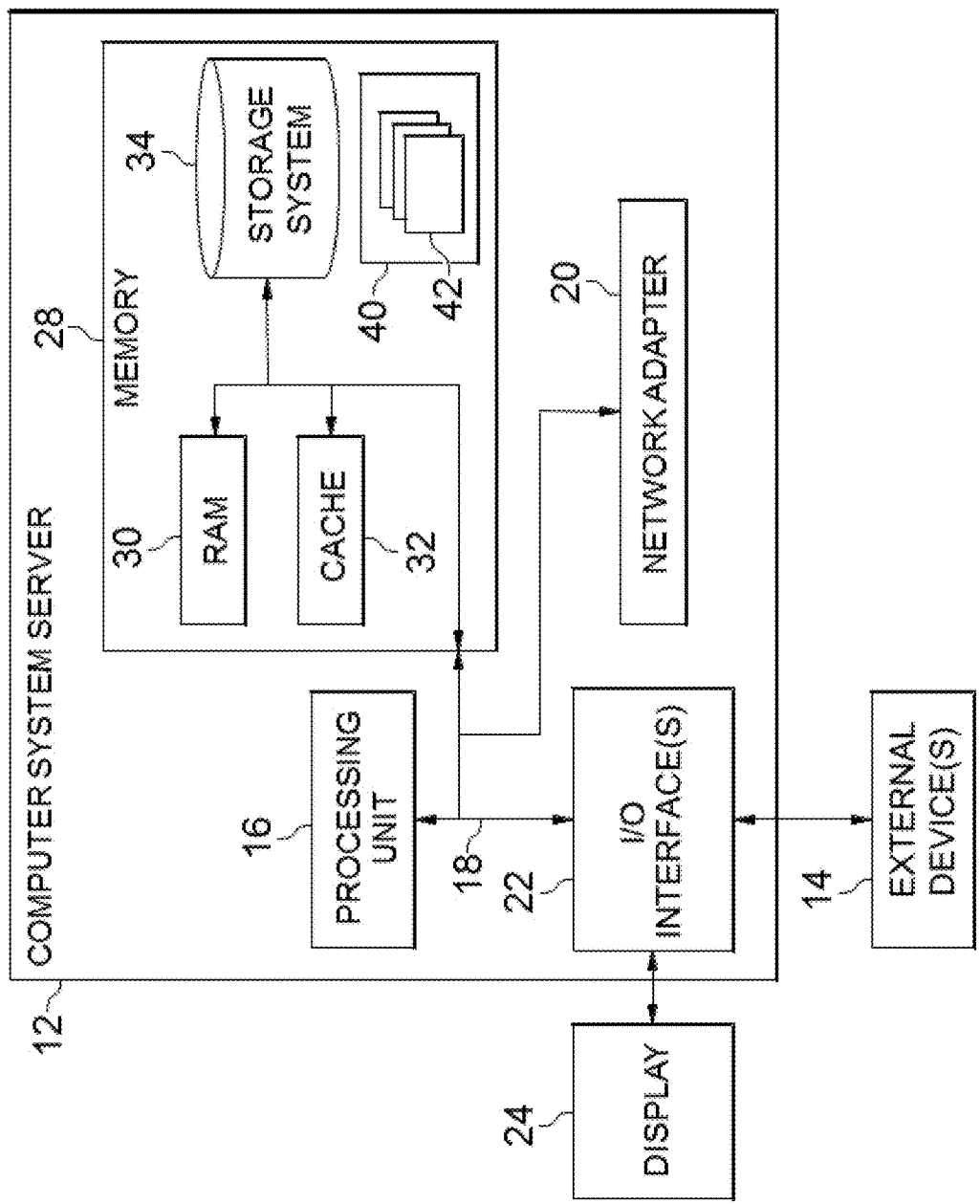
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 4:
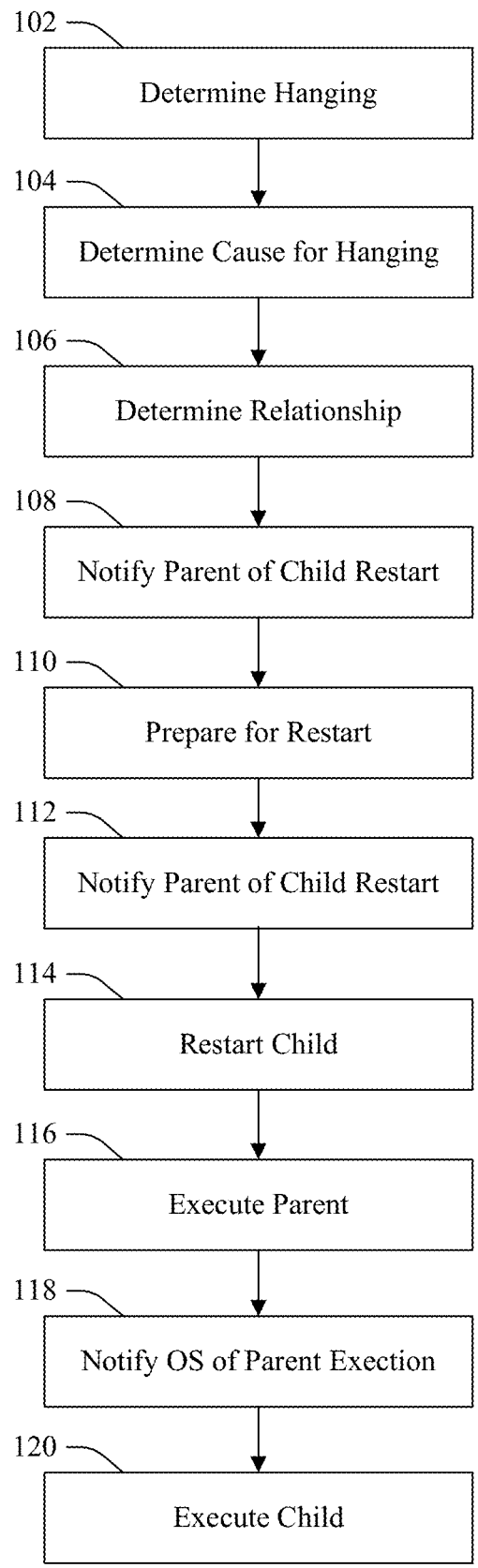
FIG. 4 is a flow chart illustration of an embodiment of the present invention.
Figure 5:
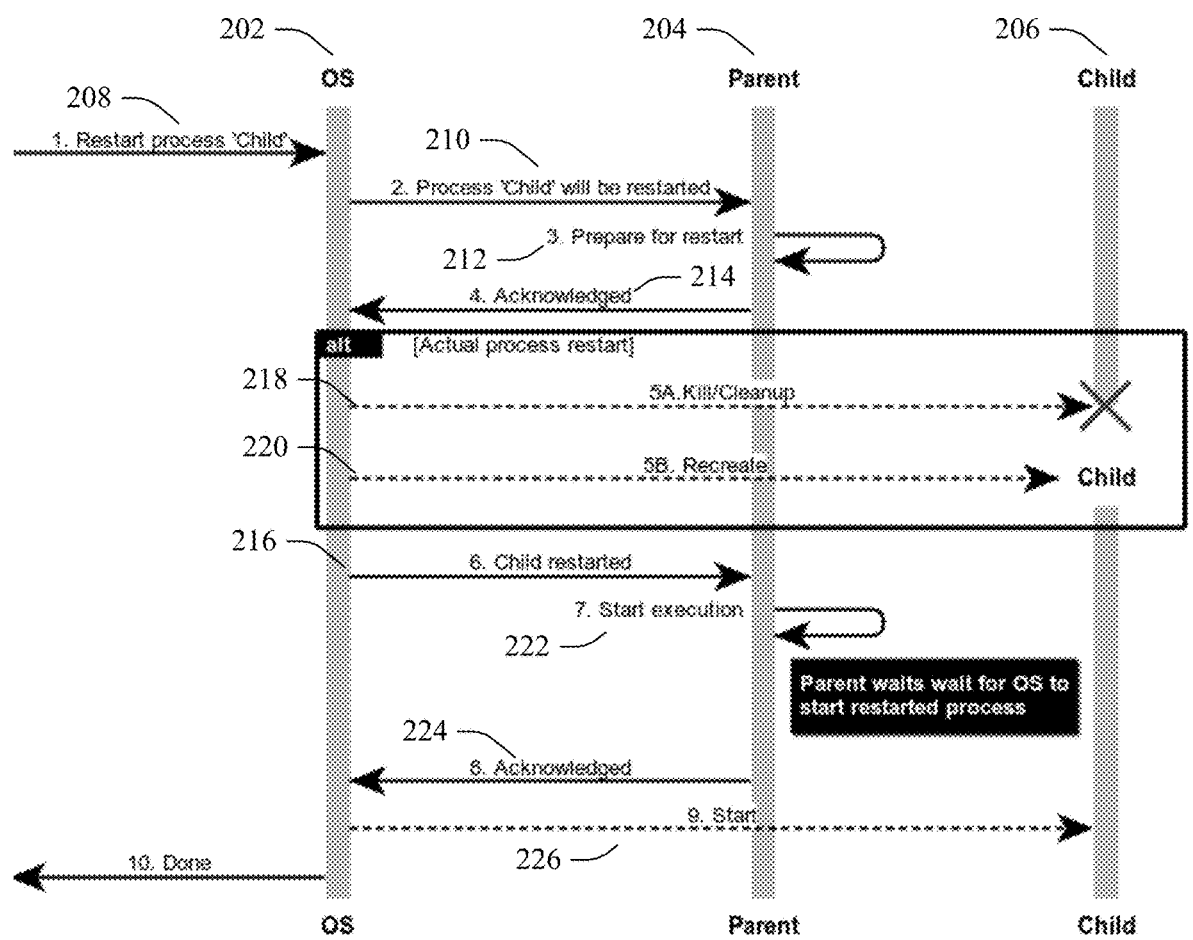
FIG. 5 is another flow chart illustration of an embodiment of the present invention.

FIG. 4 illustrates a process or system according to the present invention for restarting a hung process. FIG. 5 illustrates an example of an implementation of the process or system depicted in FIG. 4 with respect to a system operating system (OS) 202, a parent process 204, and a child process 206.

At 102, and further illustrated at 208, a processor that is configured according to an aspect of the present invention (the "configured processor") determines an inplace, executing process is hung (the "hung process") and notifies the OS that the process needs restart. In one instance, the configured processor determines the process is hung as a function of a time needed to complete the process and a predetermined threshold. For example, the configured processor may determine a process takes 2 seconds to complete and a threshold time for completing the process is 2.5 seconds. After 2.5 seconds, the configured processor determines the process is hung. In another instance, the configured processor determines the process is hung as a function of the process non-responsiveness to a set of inputs and a predetermined threshold. For example, the configured processor may determine that a process has failed to respond to an input three times and a threshold number of failures is 2. After the third failure to respond to an input, the configured processor determines the process is hung. In yet another instance, the configured processor determines the process is hung as a function of a response from a hung monitoring tool.

At 104, the configured process determines a cause for the process hanging.

In one instance, the configured process determines the cause by comparing an amount of memory needed to complete the process to an amount of memory allocated for the process and/or to a predetermined threshold. For example, the configured processor may determine the process may require 10 kilobytes (kB) of computer system memory to execute the process. The configured process may further determine that computer system has allocated 5 kB for the process. Since the required memory exceeds the allocated memory, the configured processor determines memory allocation as the cause for the process hanging. In another example, the configured processor compares the allocated memory and required memory to a predetermined threshold. If the allocated memory is 15 kB and the required memory is 14 kB and a predetermined threshold is 2 kB, then the configured processor determines that memory allocation is the cause for the process hanging as the difference between the allocated memory and the required memory less than the predetermined threshold.

In another instance, the configured processor determines the cause for the process hanging by comparing an amount of central processing unit (CPU) needed to complete the task to an amount of the central processing unit allocated to complete the process and/or a predetermined threshold. For example, the configured processor may determine that 5% of the CPU is needed to complete the task, but only 4% of the CPU has been allocated to the task. Since the amount of the CPU needed to complete the task exceeds the allocated amount, the configured processor determines CPU allocation as the cause for the process hanging. In another example, the configured processor compares the allocated amount of the CPU and required amount of the CPU needed to complete the task to a predetermined threshold. If the allocated amount is 10% and the required amount is 9% and a predetermined threshold is 2%, then the configured processor determines that CPU allocation is the cause for the process hanging as the difference between the allocated amount and the required amount less than the predetermined threshold.

At 106, the configured processor determines a relationship of the hung process to other processes. In one instance, the configured processor determines the process is a child process by determining that the process is dependent upon data or another input from another process. The configured process determines the process is dependent upon another process by examining the code of the child process to determine if the process is a subset of another process. The configured processor further determines the process that the child process is dependent upon as a parent process. An example of a parent/child process is shown in FIG. 6. In this example, "ScriptA.sh" 302 is a parent process, and "ScriptB1.sh, 125" 304, "ScriptB1.sh, 126" 306, and "ScriptB3.sh, 229" 308 are children processes.

At 108, and further illustrated at 210, in response to determining that the hung process is a child process, the configured process executes code in the operating system that notifies the parent process that the child process will be restarted and causes the operating system to pause the parent process.

At 110, and further illustrated at 212, in response to notifying the parent process that the child process will be restarted, the configured processor instructs the parent process to prepare for restart by executing parent process restart code as a function of the determined cause for the process hanging.

In one instance, in response to determining that memory allocation is the determined cause, the configured processor executes code within the parent process at 110 to reallocate/liberate memory or migrate the parent and child process to a new unallocated memory location with enough memory to execute the parent and child process. For example, if the process requires 10 kB of memory and only 8 kB of memory has been allocated for the process, then configured processor may execute parent process code that ends an idle process that is consuming 2 kB or more of memory.

In another example, in response to determining that the process requires 10 kB of memory and only 8 kB of memory has been allocated for the process and the configured processor determines that a non-related process requires 10 kB of memory but has been allocated 20 kB of memory, then the configured processor may reorganize the allocated data so that only 18 kB of data is allocated for the unrelated process and 10 kB of data is allocated for the hung process.

In another example in response to determining that the process requires 10 kB of memory and only 8 kB of memory has been allocated for the process and the configured processor determines that another system memory location contains 15 kB of unallocated system memory, the configured processor migrates the parent and child process to the unallocated system memory.

In yet another example in response to determining that the process requires 10 kB of memory and only 8 kB of memory has been allocated, then the configured processor may execute parent process code that liberates 2 kB of memory by cleaning up parent/child process code. This may include deleting leftover data structures or unwanted materials from the memory, deallocating code that was previously allocated dynamic memory, the explicit deletion of variables, and removing temporary files after execution.

In another instance, in response to determining that CPU allocation is the determined cause, then the configured processor executes code within the parent process to reallocate/liberate CPU processing power. This process is similar to the process discussed above with respect to memory liberation/reallocation.

At 112, and further illustrated at 214, the configured processor notifies the operating system that the hung process is ready for restart.

At 114, and further illustrated at 216, in response to notifying the operating system that the hung process is ready for restart, the configured processor executes code in the operating system to restart the child process in the same or a new memory location and notify the parent process that the child process has been restarted. In one instance, as illustrated at 218, the configured processor executes code that kills or cleans up the child process. This may include a further code cleanup of the child process in order to liberate memory. After the code is further cleaned up, the process is restarted in the same/new memory location. If the process is killed, the configured process restarts the process in the same/new memory location. In another instance, as illustrated at 220, a child process may be recreated. This may include a creating a backup of the child process in the system memory followed by a recreation of the backup.

At 116, and further illustrated at 222, in response to being notified to restart the child process, the configured processor executes the code within the parent process to begin execution of the parent process.

At 118, and further illustrated at 224, the configured processor notifies the operating system that the parent process is being executed.

At 120, and further illustrated at 226, in response to being notified that the parent process is being executed, the configured processor executes code in the operating system to execute the child process. The child and parent process may be recreated and restarted in the same memory previously allocated to the process, thereby preserving process handlers and memory pointers, or restarted in allocation a new memory location.

Aspects described herein address a situation when a process that is running under operating system control hangs and there is no possibility to continue or restart execution. From an operating system perspective, the only way to restart execution of the process is to kill the process using 'kill <processPid>' command, after obtaining process ID with 'ps' command. This approach causes the parent process to move forward and may lead to errors, miscalculations, or termination of execution. As a result, the entire process tree may need to be restarted. In cases where there is a complex tree of parents and children process, it is not desirable to terminate the execution of whole process tree while some child process hangs.

Current solutions for process restart include restarting the application, which process has stopped working by using system tools like watchd or by attempting to restart the faulty process in more complex manner by observing potential fault conditions and performing restarts with different time intervals to find the actual fault cause.

Aspects described herein enhance an operating system that controls process creation and execution by identifying a child process as hung and restarting the child process without having to restart the entire process tree, including the parent process. In one embodiment, the child process is restarted without checking its state. Such restarting is implemented on the operating system level and does not cause the process tree (or the parent process) to continue/close at the moment in time when child process is being restarted. After execution, the operating system holds the execution of the parent process, recreates the hung child process and then continues execution of parent process. Then, when the child process successfully ends, the parent process processing flow continues. Aspects described herein provide an advantage over presently known process restart solutions by allowing a parent process to perform additional steps to prepare for child process restart.

In one instance, a set of scripts performs a complex task. This instance is shown in FIG. 6. Starting script, 'ScriptA.sh'. 302 is calling a set of subscripts 304-308. Each of script 304-308 can call either system commands or script that might require calls to other tools. FIG. 6 shows the mutual dependencies between process as well as process identifiers and command line parameters. Assuming that the first worker 310 has stopped responding. This worker 310 was supposed to perform some calculation using the range defined by command line parameters and as a result of its failure, the calculations will not be completed or executed at all. When the process is killed there will be no available results. With process restarter solution described herein, the process respawns with the same command line parameters and the process execution tree remains the same. After the operating system restarts worker 310, control returns to parent process 312 and execution continues without interruption.

In another embodiment, restart can take place with mutual communication between parent process, child process and operating system. In this instance, a binary program with special indicator (for example in the area of ELF header for Unix-like binaries) informs the operating system that a binary supports process restart. This allows the operating system to immediately return information to the configured process that this particular process is able to perform a process restart. When a parent process creates child process within executed source code, the parent process holds reference to the child process and is able to communicate with the child process. At some moment in time, child process hangs, and the configured processor determines that child process is not progressing. As a result, the child needs to be either killed or restarted. The configured processor then decides to restart the child process. To do this, configured processor executes a 'kill-restart <processPid>' command, providing child process identifier as a parameter. As the program allows process restart, the above described processes restart the child process.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for restarting a hung process, comprising executing on a computer processor:
   in response to determining that a child process that is executing within an operating system is in a hung state, pausing a parent process that is executing within the operating system, wherein a data operation of the parent process is dependent upon a data output of the child process;
   determining a cause of the hung state of the child process;
   readying the parent process to restart as a function of the determined cause of the hung state of the child process; and
   in response to determining that the parent process is ready for restart, notifying the operating system that the child process is ready for restart, restarting the paused parent process and restarting the child process.

2. The method of claim 1, further comprising:
   integrating computer-readable program code into a computer system comprising a processor, a computer readable memory in circuit communication with the processor, and a computer readable storage medium in circuit communication with the processor; and wherein the processor executes program code instructions stored on the computer-readable storage medium via the computer readable memory and thereby performs the pausing of the parent, the determining the cause of the hung state of the child process, the readying of the parent process to restart, the notifying of the operating system that the child process is ready for restart, the restarting of the paused parent process, and the restarting of the child process.

3. The method of claim 2, wherein the computer-readable program code is provided as a service in a cloud environment.

4. The method of claim 1, wherein the determining the cause of the hung state of the child process comprises determining an amount of memory needed to complete the child process is below an amount of memory allocated to the child process;

wherein the readying the parent process to restart comprises determining an amount of memory needed to complete the child process by comparing the amount of memory allocated to the child process to the determined amount of memory needed to complete the child process, and reallocating the determined amount of system memory needed to complete the child process; and the method further comprising:

restarting the child process within the reallocated system memory.

5. The method of claim 1, wherein determining the cause of the hung state of the child process comprises determining an amount of memory needed to complete the child process is below an amount of memory allocated to the child process;

wherein the readying the parent process to restart comprises determining a second system memory location comprises more memory than the determined amount of system memory needed to complete the child process; and the method further comprising:

migrating the child process to the second system memory location; and executing the child process within the second system memory location.

6. The method of claim 1, wherein the determining the cause of the hung state of the child process comprises determining an amount of memory needed to complete the child process is below an amount of memory allocated to the child process;

wherein the readying the parent process to restart comprises determining an amount of system memory needed to complete the child process by comparing the amount of system memory allocated to the child process to the determined amount of memory needed to complete the child process; and the method further comprising:

liberating the determined amount of system memory needed to complete the child process by deleting a leftover data structure or an unwanted material from the parent or child process; and executing the child process within the liberated memory.

7. The method of claim 1, wherein the determining the cause of the hung state of the child process comprises determining an amount of the central processing unit allocated to the child process is below an amount needed to complete the child process;

wherein the readying the parent process to restart comprises determining an amount of central processing unit processing power needed to complete the child process by comparing the amount of central processing unit processing power allocated to the child process to the determined amount of central processing unit processing power needed to complete the child process; and the method further comprising:

reallocating the determined amount of system central processing unit processing power needed to complete the child process; and restarting the child process with the reallocated central processing unit processing power.

8. The method of claim 1, wherein the restarted child process is selected from the group consisting of a recreated child process, a previously killed child process, or a cleaned-up child process.

9. A system comprising:

a processor;

a computer readable memory in circuit communication with the processor; and a computer readable storage medium in circuit communication with the processor; wherein the processor executes program instructions stored on the computer-readable storage medium via the computer readable memory and thereby:

in response to determining that a child process that is executing within an operating system is in a hung state, pauses a parent process that is executing within the operating system, wherein a data operation of the parent process is dependent upon a data output of the child process;

determines a cause of the hung state of the child process;

restarts the parent process to restart as a function of the determined cause of the hung state of the child process; and in response to determining that the parent process is ready for restart, notifies the operating system that the child process is ready for restart, restarts the paused parent process and restarts the child process.

10. The system of claim 9, wherein the determining the cause of the hung state of the child process comprises determining an amount of memory needed to complete the child process is below an amount of memory allocated to the child process;

wherein the readying the parent process to restart comprises determining an amount of memory needed to complete the child process by comparing the amount of memory allocated to the child process to the determined amount of memory needed to complete the child process, and reallocating the determined amount of system memory needed to complete the child process;

wherein the processor executes the program instructions stored on the computer-readable storage medium via the computer readable memory and thereby:

restarts the child process within the reallocated system memory.

11. The system of claim 9, wherein determining the cause of the hung state of the child process comprises determining an amount of memory needed to complete the child process is below an amount of memory allocated to the child process, wherein the readying the parent process to restart comprises determining a second system memory location comprises more memory than the determined amount of system memory needed to complete the child process, wherein the processor executes the program instructions stored on the computer-readable storage medium via the computer readable memory and thereby:

migrates the child process to the second system memory location; and executes the child process within the second system memory location.

12. The system of claim 9, wherein the determining the cause of the hung state of the child process comprises determining an amount of memory needed to complete the child process is below an amount of memory allocated to the child process;

wherein the readying the parent process to restart comprises determining an amount of system memory needed to complete the child process by comparing the amount of system memory allocated to the child process to the determined amount of memory needed to complete the child process; and wherein the processor executes the program instructions stored on the computer-readable storage medium via the computer readable memory and thereby:

liberates the determined amount of system memory needed to complete the child process by deleting a leftover data structure or an unwanted material from the parent or child process; and executes the child process within the liberated memory.

13. The system of claim 9, wherein the determining the cause of the hung state of the child process comprises determining an amount of the central processing unit allocated to the child process is below an amount needed to complete the child process;

wherein the readying the parent process to restart comprises determining an amount of central processing unit processing power needed to complete the child process by comparing the amount of central processing unit processing power allocated to the child process to the determined amount of central processing unit processing power needed to complete the child process;

wherein the processor executes the program instructions stored on the computer-readable storage medium via the computer readable memory and thereby:

reallocates the determined amount of system central processing unit processing power needed to complete the child process; and restarts the child process with the reallocated central processing unit processing power.

14. The system of claim 9, wherein the restarted child process is selected from the group consisting of a recreated child process, a previously killed child process, or a cleaned-up child process.

15. A computer program product for restarting a hung process, comprising executing on a computer processor, the computer program product comprising:

a computer readable storage medium having computer readable program code embodied therewith, wherein the computer readable storage medium is not a transitory signal per se, the computer readable program code comprising instructions for execution by a processor that cause the processor to:

in response to determining that a child process that is executing within an operating system is in a hung state, pause a parent process that is executing within the operating system, wherein a data operation of the parent process is dependent upon a data output of the child process;

determine a cause of the hung state of the child process;

restart the parent process to restart as a function of the determined cause of the hung state of the child process; and in response to determining that the parent process is ready for restart, notify the operating system that the child process is ready for restart, restart the paused parent process and restart the child process.

16. The computer program product of claim 15, wherein the determining the cause of the hung state of the child process comprises determining an amount of memory needed to complete the child process is below an amount of memory allocated to the child process;

wherein the readying the parent process to restart comprises determining an amount of memory needed to complete the child process by comparing the amount of memory allocated to the child process to the determined amount of memory needed to complete the child process, and reallocating the determined amount of system memory needed to complete the child process;

wherein the computer readable program code instructions for execution by the processor further cause the processor to:

restart the child process within the reallocated system memory.

17. The computer program product of claim 15, wherein determining the cause of the hung state of the child process comprises determining an amount of memory needed to complete the child process is below an amount of memory allocated to the child process, wherein the readying the parent process to restart comprises determining a second system memory location comprises more memory than the determined amount of system memory needed to complete the child process, wherein the computer readable program code instructions for execution by the processor further cause the processor to:

migrate the child process to the second system memory location; and execute the child process within the second system memory location.

18. The computer program product of claim 15, wherein the determining the cause of the hung state of the child process comprises determining an amount of memory needed to complete the child process is below an amount of memory allocated to the child process;

wherein the readying the parent process to restart comprises determining an amount of system memory needed to complete the child by comparing the amount of system memory allocated to the child process to the determined amount of memory needed to complete the child process; and wherein the computer readable program code instructions for execution by the processor further cause the processor to:

liberate the determined amount of system memory needed to complete the child process by deleting a leftover data structure or an unwanted material from the parent or child process; and execute the child process within the liberated memory.

19. The computer program product of claim 15, wherein the determining the cause of the hung state of the child process comprises determining an amount of the central processing unit allocated to the child process is below an amount needed to complete the child process;

wherein the readying the parent process to restart comprises determining an amount of central processing unit processing power needed to complete the child process by comparing the amount of central processing unit processing power allocated to the child process to the determined amount of central processing unit processing power needed to complete the child process;

wherein the computer readable program code instructions for execution by the processor further cause the processor to:

reallocate the determined amount of system central processing unit processing power needed to complete the child process; and restart the child process with the reallocated central processing unit processing power.

20. The system of claim 15, wherein the restarted child process is selected from the group consisting of a recreated child process, a previously killed child process, or a cleaned-up child process.

* * * * *